United States Patent
Elzur

(10) Patent No.: US 7,398,300 B2
(45) Date of Patent: Jul. 8, 2008

(54) ONE SHOT RDMA HAVING A 2-BIT STATE

(75) Inventor: Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 317 days.

(21) Appl. No.: 10/642,023

(22) Filed: Aug. 14, 2003

(65) Prior Publication Data

US 2004/0034725 A1 Feb. 19, 2004

Related U.S. Application Data

(60) Provisional application No. 60/403,817, filed on Aug. 14, 2002.

(51) Int. Cl.
*G06F 15/167* (2006.01)
*G06F 13/28* (2006.01)
(52) U.S. Cl. .................................. 709/212; 710/22
(58) Field of Classification Search ............. 709/212, 709/217; 719/312, 313; 710/22, 26, 36, 710/37, 11, 19; 711/163
See application file for complete search history.

(56) References Cited

U.S. PATENT DOCUMENTS 5,956,341 A * 9/1999 Galand et al. ............ 370/412
6,163,834 A 12/2000 Garcia et al. ............ 711/206
6,333,929 B1 12/2001 Drottar et al. ............ 370/362
6,535,518 B1 3/2003 Hu et al. ................. 370/401
6,799,220 B1 * 9/2004 Merritt et al. ............ 709/238
2002/0145976 A1 * 10/2002 Meyer et al. ............ 370/235
2004/0049601 A1 * 3/2004 Boyd et al. ............. 709/250

FOREIGN PATENT DOCUMENTS

EP 0887735 A 12/1998

* cited by examiner

*Primary Examiner*—Alan S Chen
(74) *Attorney, Agent, or Firm*—McAndrews, Held & Malloy, Ltd.

(57) ABSTRACT

A system and method for managing memory resources in a system that allows remote direct access of memory. An aspect of the invention provides for automatically un-binding bound direct-access memory resources based on information received in messages from a remote source. The information may, for example, include a last-segment indicator to indicate that the message segment is the last expected message segment for a message. Another aspect of the invention provides for memory management of directly-accessible sections of memory by assigning a flag to indicate when the section of memory has special access restrictions, such as a set number of allowable accesses. Yet another aspect of the invention provides for a flag to represent when the access restrictions associated with a particular section of memory have been met.

24 Claims, 6 Drawing Sheets

Figure 2 - PRIOR ART

ONE SHOT RDMA HAVING A 2-BIT STATE

CROSS-REFERENCE TO RELATED APPLICATIONS/INCORPORATION BY REFERENCE

This application makes reference to, claims priority to and claims benefit from U.S. Provisional Patent Application Ser. No. 60/403,817, entitled "One Shot RDMA Having Only a 2 Bit State" and filed on Aug. 14, 2002, the contents of which are hereby incorporated herein in their entirety by reference.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The demand for bandwidth in networking applications and faster network speeds are increasing faster than the memory bandwidth and processing power of the computer nodes that process the data traffic. The migration to 10 Gigabit Ethernet is also exacerbating the problem. Typically, communication via TCP/IP requires data copying operations that utilize valuable CPU and memory resources and add latency.

Remote Direct Memory Access (RDMA) technology over TCP addresses various bandwidth and processing power issues. With RDMA over TCP, a significant amount of protocol processing overhead may be moved to the Ethernet adapter, for example an RDMA Network Interface card (RNIC). Also, every incoming network packet contains enough information such that the packet may be placed directly into a final destination memory address. The property of direct data placement (DDP) possessed by RDMA eliminates the need for intermediate memory copies and other related memory and processor resource demands. It may also remove the need for data buffering on the NIC. In addition, the reduction of data copy operations that RDMA provides results in reduced latency.

With RDMA, a first computer may directly write information into a second computer's memory with very few demands on the bandwidth of the memory bus and the processing overhead of an associated CPU. Memory protection semantics may also be preserved. Therefore, RDMA, as well as Direct Memory Access in general, provides many benefits.

When reading from or writing to a memory location associated with a Memory Region (MR) or a Memory Window (MW), some applications may need to ensure that memory is accessible exactly one time or some limited number of times. For example, there are security concerns associated with leaving host memory exposed for extended periods of time. When managing host memory, excessive overhead costs may result from tearing down the registration of the MR or MW with the RNIC, assigning the resource to another consumer (e.g., another thread or another memory location), and registering the resource again with the RNIC. Tearing down the resource registration consumes software resources and makes resource recycling less efficient due to longer time required from the time the remote last uses the resources until they are removed and can become available for another use. Alternatively, if memory is registered with the RNIC while assigning the same memory to another consumer, undesired side effects of exposing resources while in transition may occur.

RDMA over TCP provides the DDP capability as described above. RDMA flexibly allows placement of information in the designated memory location even when the TCP segment carrying that information arrives at the destination out-of-order, resulting in a TCP hole. Support for a 'one-shot' resource usage when DDP service is requested for out-of-order frames complicates the control mechanism of the 'one-shot' or alternatively requires buffering till the TCP hole is plugged. Both of these options add cost and complexity and should be avoided if at all possible. Accordingly, there is a strong need in the DDP/RDMA art for less complicated memory control technology that requires little or no additional buffering.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for managing memory resources in a system that allows remote direct access of memory. An aspect of the present invention provides for automatically un-binding bound direct-access memory resources based on information received in messages from a remote source. The information may, for example, include a last-segment indicator to indicate that the message segment is the last expected message segment for a message. The automatic un-binding may be performed, for example, in response only to information received from the remote source. The automatic un-binding may also be performed, for example, entirely by processing hardware disposed on a network interface card. Another aspect of the present invention provides for memory management of remotely and directly accessible sections of memory by assigning a flag to indicate when a section of memory has special access restrictions, such as a set number of allowable remote accesses. One aspect of the present invention provides for one-shot accessing of a memory resource made available to a remote entity. When the one-shot access requirements are met, the memory resource is un-bound and further access is denied. Yet another aspect of the invention provides for a flag to represent when the access restrictions associated with a particular section of memory have been met. For example, the flag may be a bit that is set to indicate that a remote source has utilized its specified allotment of accesses for a particular memory resource.

These and other advantages, aspects and novel features of the present invention, as well as details of an illustrated embodiment thereof, will be more fully understood from the following description and drawings.

DETAILED DESCRIPTION OF THE INVENTION

Figure 1:
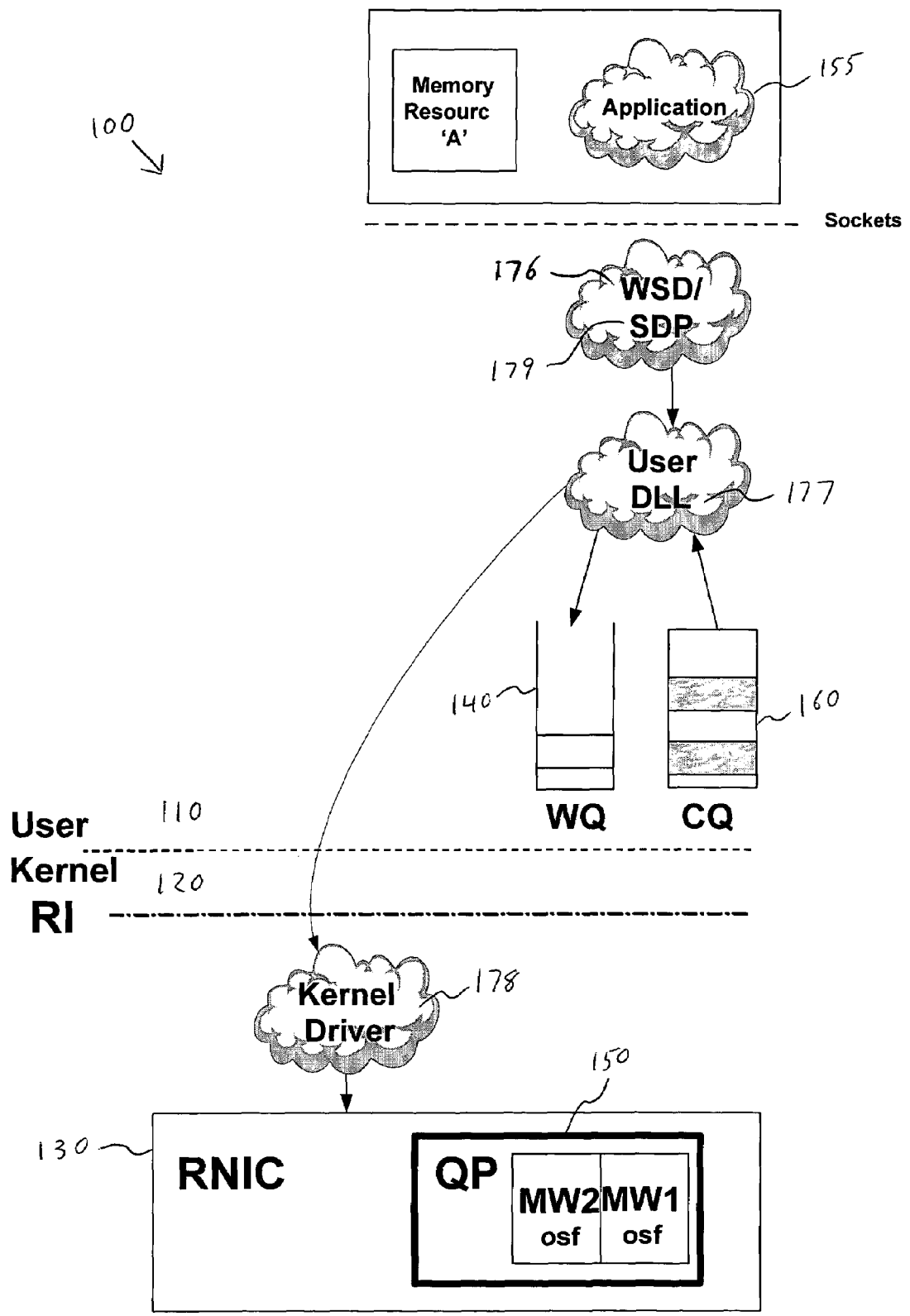
FIG. 1 is a diagram of an exemplary system that exposes a resource to be accessed by a remote peer in accordance with various aspects of the present invention.

Refer to FIG. 1, which is a diagram of an exemplary system 100 that exposes a resource to be accessed by a remote peer in accordance with various aspects of the present invention. An example of such a system is the Remote Direct Memory Access (RDMA) model. Though, the following discussion may occasionally focus on aspects of the RDMA model, the present invention is by no means limited to a particular Memory Access model including a remote machine.

In the RDMA model, an application that owns a resource and chooses to expose it to a remote peer may reside in the User space 110 or in the Kernel space 120 of its machine. The User space 110 and Kernel space 120 are defined within the operating system. The application may, for example, submit a Work Request (WQE) to the RNIC 130 using a Work Queue (WQ) 140 that is associated with a connection, which is known as a Queue Pair (QP) 150. The RNIC 130 reads the entries on the WQ 140, executes the WQE and informs the application of its status by posting a Completion Entry (CQE) on the Completion Queue (CQ) 160 associated with the QP 150. The application 155, or the User DLL, then acquires the Completion Entry (CQE) from the Completion Queue (CQ) 160 and processes the CQE to obtain notification for the completion of the application's prior Work Request (WQE).

A user space application 155 may refer to a memory resource as a range of Virtual Addresses (VA). This memory resource can be used locally and by a remote peer following certain rules (e.g., the RDMA rules) depending on whether the memory resource is a Memory Region (MR) or a Memory Window (MW). For more information on such memory resources and RDMA in general, refer to the RDMA rules, for example as stated in "An RDMA Protocol Specification", version 1.0, published by the RDMA Consortium, which are hereby incorporated herein in their entirety by reference.

The application, or some middle-ware software working on the application's behalf (e.g., Winsock Direct "WSD" 176 or Socket Direct Protocol "SDP" 179 along with the User Dynamic Linking Library "DLL" 177 and Kernel Driver 178), registers the MR or MW with the RNIC before the resource can be exposed to a remote peer. The application 155 or other software may, for example, register the MR or MW using the WQ 140 or by any other way of communicating to the RNIC 130. As the RNIC 130 registers the resource, the RNIC 130 provides a token back to the application or the middle-ware software working on the application's behalf (or in general terms, the "consumer"). The consumer uses this token for future reference to the registered resource by the local consumer or the remote peer. This token is known as the Steering Tag (or STag).

When the RNIC 130 receives a request from a remote peer to access the resource, the request will include the STag, which the RNIC 130 will analyze to determine whether the remote peer has access rights and to determine whether the remote peer is attempting to access beyond the registered boundaries of the resource, as set by the local consumer registering the resource with the RNIC 130.

Unlike the consumer, which may use Virtual Addresses or Physical Addresses, the hardware (or RNIC 130 in this example) accesses the memory using physical addresses. The RNIC 130 typically maintains its translations from Virtual Address (VA) to Physical Address (PA) in a Translation and Protection Table (TPT), along with the STag and the associated resource boundaries. When the local consumer determines that the resource is not to be exposed any longer, the local consumer submits a request to the RNIC 130 (e.g., on the WQ or by other means) to un-register (or unbind) the resource.

Each such request to the RNIC 130 consumes time on behalf of the consumer to build the request and submit the request to the RNIC 130 over the bus connecting the host CPU to the RNIC 130. The RNIC 130 then processes the request, updates its internal table/s (TPT), and sends a completion indication and status back to the consumer. In many cases, this hardware access and management requires a substantial amount of time relative to other system activities and may accordingly degrade the overall system performance.

Note that the application (or consumer) may reside in the Kernel space, rather than the User space. For example, consider a protocol providing services to the OS Storage stack (e.g., iSCSI extensions for RDMA or iSER). In such a scenario, the same or similar mechanisms as described above may be utilized, but with Kernel components instead of User components.

Figure 2:
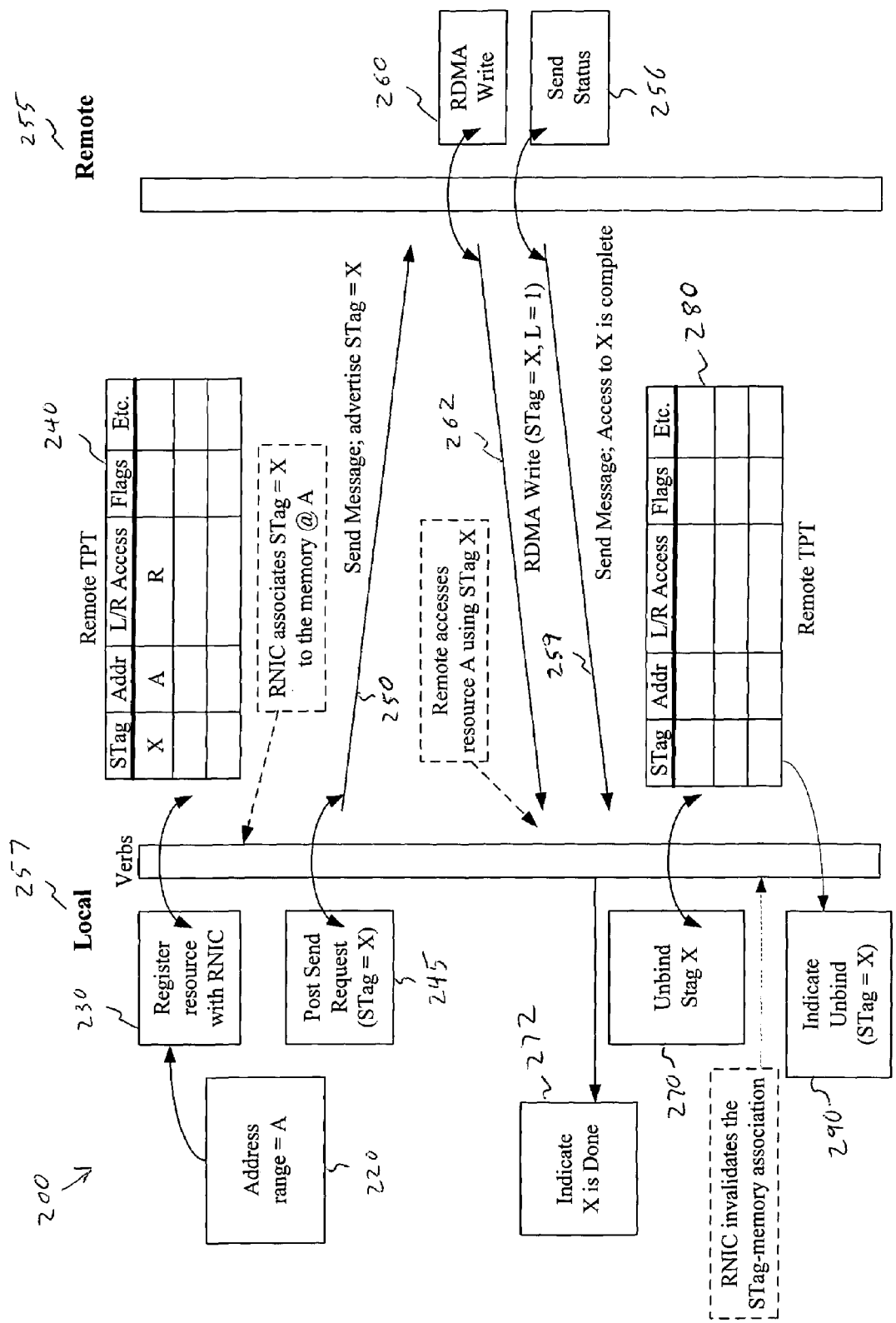
FIG. 2 is a diagram illustrating memory resource registration and memory resource un-binding in response to a software request.

Refer now to FIG. 2, which is a diagram 200 illustrating memory resource registration and memory resource un-binding in response to a software request according to various aspects of the present invention. The memory resource may, for example, represent a contiguous address space in the Virtual Address (VA) space or a Scatter Gather List (SGL) in the Physical Address (PA) space, which can be described as a contiguous space in the Virtual Address space.

The software designates an address range "A" 220. The software issues a request to the hardware (e.g., RNIC) to register the resource 230. In response to the registration request, the RNIC updates its table 240 (e.g., a Translation and Protection Table, TPT) with mapping from the VA or PA to the STag allocated and other related information, such as, for example boundaries of the resource and access rights.

After the hardware registers the resource and assigns a STag to the resource, the software may post a send request 245, including the STag, to the hardware, which results in the hardware sending a message 250 to the Remote 255 advertising (or announcing) the STag. At this point, the resource is registered and the Remote 255 knows the STag to use to access the corresponding resource at the Local 257.

Continuing with the example illustrated in FIG. 2, the Remote 255 posts an RDMA Write command 260 with the appropriate STag, which results in an RDMA Write message 262 travelling through a network to the Local 257. The execution of the RDMA Write message 262 results in data being written to the memory resource indicated by the STag value accompanying the RDMA Write message 262.

At some point, the Local Consumer will post an "Un-bind" request 270 to disallow further access to the resource. This may be initiated, for example, by the Remote 255 posting a Send Status request 256 to send a Send Message 259 to the Local 257 indicating that the Remote's access to the STag X is complete. The Send Message 259 may, in turn, trigger an Indication 272 from the hardware telling the software that STag X is done. The "Un-bind" request 270 may identify the resource by including the appropriate STag value with the request. "Un-binding" is the activity of removing the resource (e.g., MR or MW) registration from the hardware. When, for example, a storage protocol request is completed, the windows are to be unbound from the QP such that memory may be reused.

Executing the "Un-bind" request 270, the hardware (e.g., a RNIC) may update its table 280 by clearing the STag and corresponding entries. Thus, the hardware effectively dissolves the STag-resource association. Lastly, the hardware may indicate 290 to the software that the resource has been un-bound.

In the previous example, the Local software initiated the un-bind operation in response to some set of conditions. As explained previously, this activity typically results in a substantial amount of overhead, which may degrade system performance. An exemplary RDMA transfer, for example an RDMA transfer originated by a User space application, may involve: setting up a memory region, setting up a window, communicating to the remote device that the window is set up, the remote device sending data to the window, the device being notified that the data transfer to the window is complete, tearing down the window, and setting up a new window. Substantial overhead may be saved by eliminating or simplifying one or more of the aforementioned steps.

In part to address this opportunity for improvement, an aspect of the present invention provides for the hardware to automatically un-bind the resource under certain conditions. This functionality may also be referred to herein as "auto-unbind." The hardware, at some point, may receive an indication (e.g., "last segment") from the Remote that is embedded in a message received from the Remote. The hardware may use this indication to initiate an auto-unbind of the resource. The hardware may also use information provided during registration (e.g., information indicating how many times the resource could be accessed) to initiate an auto-unbind of the resource. The hardware, accordingly, does not necessarily need guidance from other Local resources and may act on information from the Remote alone.

Accordingly, the software does not need to tell the hardware to un-bind the resource. The hardware should, however, tell the software that the resource was removed. The hardware can effect this communication in a variety of ways. For example, to minimize local overhead, if there is no need to convey a direct indication, the indication may be consolidated with other information.

Figure 3:
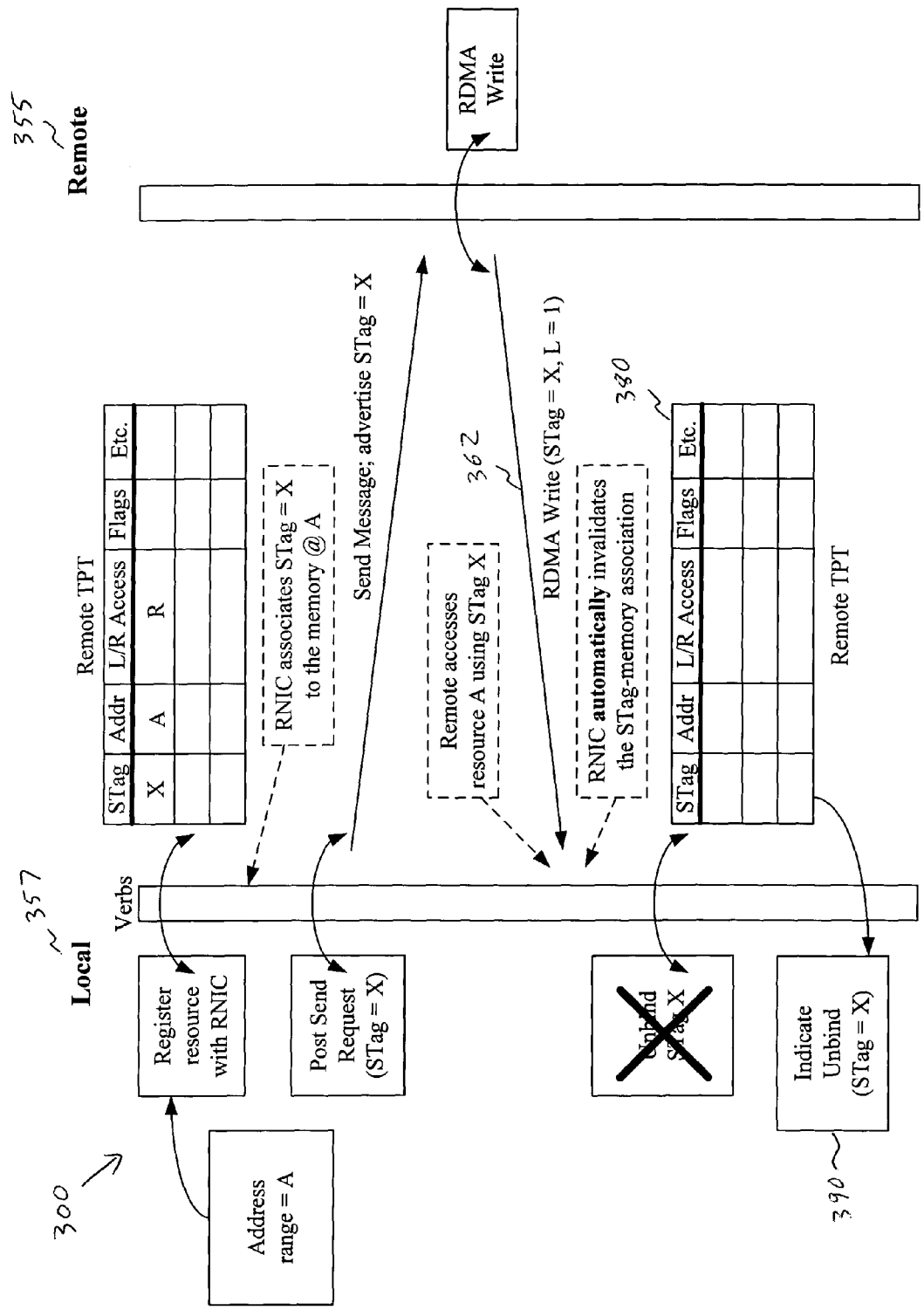
FIG. 3 is a diagram illustrating memory resource registration and memory resource automatic un-binding (auto-unbind) in response to information arriving in a remote message according to various aspects of the present invention.

Refer now to FIG. 3, which is a diagram 300 illustrating memory resource registration and memory resource automatic un-binding (auto-unbind) in response to a information arriving in a Remote message according to various aspects of the present invention. FIG. 3 is similar to FIG. 2 until the RDMA Write message 362 arrives at the Local 357. Significantly, the auto-unbind process illustrated in FIG. 3 does not include the FIG. 2 "Un-bind" request 270 from software to hardware. The hardware may act on the information from the Remote 355 alone or, for example, from the status message.

The RDMA Write message 362 arrives at the Local 357 and has embedded in it, an indicator (e.g., L=1), which signifies to the Local 357 hardware that this is the only or last segment of the RDMA Write message 362. Write messages may consist of only one message segment or a large number of message segments. Additionally, the hardware may derive an indication from the content of a message, such as, for example, the Status message. Upon detecting the indicator, the hardware (e.g., the RNIC) automatically un-binds the resource. In other words, the hardware automatically invalidates the STag-memory association, for example, by removing the association from the hardware's translation table 380. Lastly, the hardware may indicate 390 to the software that the hardware un-bound the resource. The hardware may act on any of a large number of potential indicators from the Remote 355. Accordingly, the scope of the present invention is by no means limited to a limited set of indicators, for example, the L-bit in RDMA.

As mentioned previously, the consumer may be concerned (e.g., for security reasons, application performance, buffer circulation, bug immunity, etc.) about exposing memory for extended periods of time. Another advantageous aspect of the current invention provides for the use of a resource exposed for the remote peer for only a limited number of times/messages. The RNIC, for example, can unbind the resource after the specified number of accesses to the resource have been performed. This aspect of the present invention may count accesses, for example, from one to relatively large values. A maximum access count of one may result in a one-shot mode, and a maximum access count of N may result in an N-shot mode.

The example of a one-access limit is discussed in more detail below. However, this by no means limits the scope of the present invention to a one-access, or one-shot, implementation. For example, for a multiple-times-access to the resource (N-shot), an aspect of the present invention may add another field to the data structure describing the resource for the RNIC. The data in this additional field may, for example, represent the number of times the RNIC should grant access to the resource. After exactly that number of times, the RNIC may automatically unbind the resource, preventing further access.

To provide for the one-access service (also referred to herein as "one-shot"), in an aspect of the present invention, two flags may be added to the data structure associated with the exposed resource (e.g., MW or MR): a one-shot-mode flag (OSM) and a one-shot-fired (OSF) flag. Note that the RNIC may, for example, keep these structures separate or bound to a QP. Also note that an aspect of the present invention utilizes single bits for the OSM and OSF flags. Accordingly, the OSM and OSF flags will often be referred to below as OSM and OSF bits, respectively. This exemplary usage of single-bit flags by no means limits the scope of the present invention to single-bit flags. For example, aspects of the present invention readily extend to an N-Shot-Mode (NSM) flag and an N-Shot-Fired (NSF) flag.

When a resource is configured as an OSM resource, the OSM bit is set in the data structure associated with the resource. When the RNIC registers the resource and resource access commences, the RNIC checks for the reception of one complete message. A complete message may, for example, include multiple independent TCP segments received separately (i.e., a Remote peer can prepare a RDMA write message that includes multiple direct data placement (DDP) segments).

The last segment of the message from the Remote peer has the Last (L) bit set. For additional information about the L-bit, one may refer to the DDP specification, "Direct Data Placement over Reliable Transports", version 1.0, published by the RDMA Consortium", which is hereby incorporated by reference herein in its entirety. Upon receipt of the message segment containing the L bit set, the RNIC sets the OSF bit. This set bit (or flag) serves as an indication that a segment with the L-bit set has been received for a particular resource. If no holes exist in the received TCP sequence up to the location of the segment containing the L-bit (i.e., the receiver RNIC has received and placed all previous sequential portions of this message), the RNIC auto-unbinds the resource preventing any further access to it.

Figure 4:
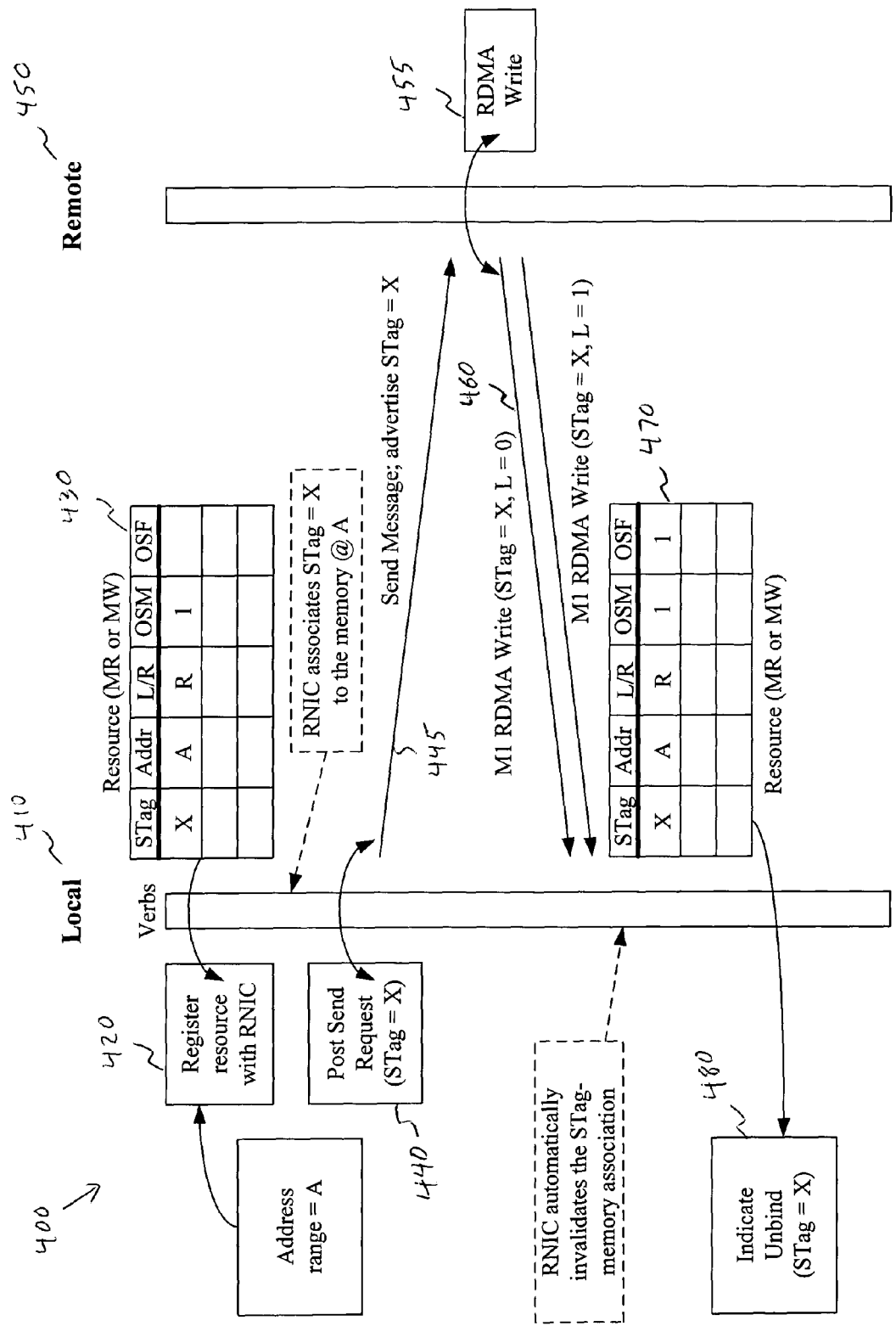
FIG. 4 is a diagram illustrating the operation of the one-shot model for the scenario where one message is sent to an exposed resource in accordance with various aspects of the present invention.

Refer now to FIG. 4, which is a diagram 400 illustrating the operation of the one-shot model for the scenario where one message is sent to the exposed resource (e.g., a MW or MR) in accordance with various aspects of the present invention. The Local 410 software posts a request for the RNIC to register the resource at address "A" 420 as a one-shot resource. In response, the RNIC associates a STag value "X" with the address "A" and updates its resource table 430 (e.g., a Remote TPT table) to include a data structure entry for the management of the resource. In addition, to accommodate the software's request for designating the resource as a one-shot resource, the RNIC sets the One-Shot-Mode (OSM) bit in its resource table 430.

After the RNIC registers the resource according to the software's request 420, the software posts a send request 440 to advertise the STag associated with the available one-shot resource. The RNIC, in turn, transmits the Send Message 445 to the Remote 450. In response to receiving the Send Message 445, the Remote 450 posts a RDMA Write request 455, which results in the transmission of a message M1.

In this example, the message is an RDMA Write message with two segments. The Remote 450 first sends the RDMA Write segment one 460 to the Local 410. The RDMA Write segment one 460 identifies the STag and sets the L-bit to 0, since the RDMA Write segment one 460 is not the last segment for the complete RDMA Write message. The Local 410 receives the RDMA Write segment one 460, and the RNIC does not detect the L-bit set, so the RNIC lets the DMA occur normally and takes no further special action.

Next, the Remote 450 sends the RDMA Write segment two 465 to the Local 410. The RDMA Write segment two 465 identifies the STag and sets the L-bit to 1, since the RDMA Write segment two 465 is the last segment for the complete RDMA Write message. The Local 410 receives the RDMA Write segment two 465, and the RNIC detects that the L-bit is set, which indicates that the RDMA Write segment two 465 is the last segment of the RDMA Write message. In response, the RNIC sets the appropriate One-Shot-Fired (OSF) bit in its resource table 470 to 1 to indicate that the last segment of the message for the one-shot resource has been received. When the last segment (or portion) of the message has been received, and there are no holes present in the TCP sequence, the RNIC un-binds the resource and sends the corresponding indication 480 to the software.

Figure 5:
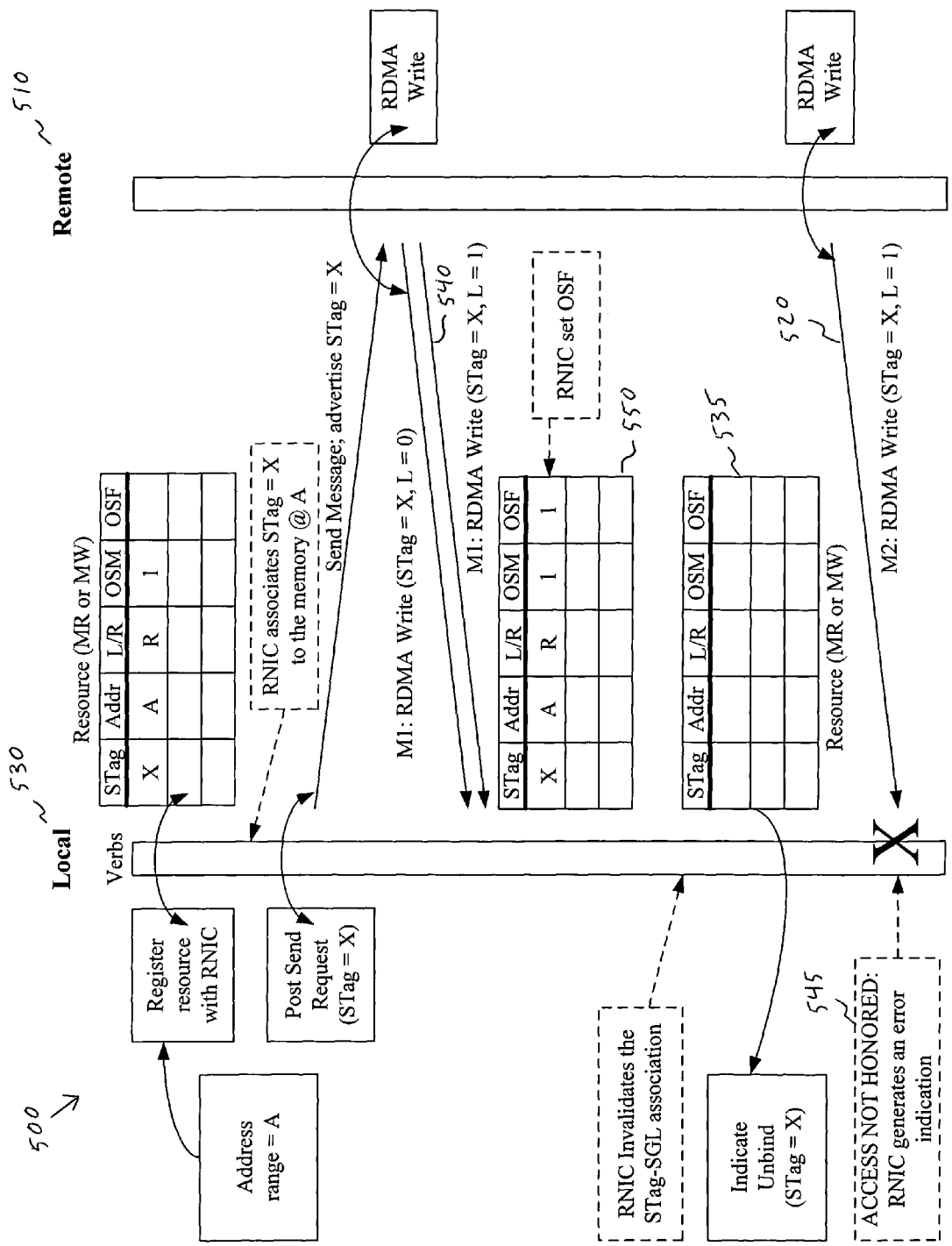
FIG. 5 is a diagram illustrating the operation of the one-shot model for the scenario where a one-shot resource has received its one message, and a second message attempts to access the one-shot resource in accordance with various aspects of the present invention.

Aspects of the 'one-shot' mechanism may prevent additional messages from the protected resource once the resource has received a complete message. Refer to FIG. 5 for an illustration. FIG. 5 is a diagram 500 illustrating the operation of the one-shot model for the scenario where a one-shot resource has received its one message, and a second message attempts to access the one-shot resource in accordance with various aspects of the present invention. The one-shot operation illustrated in FIG. 5 is similar to that illustrated in FIG. 4, until the Remote 510 initiates a second message 520.

When the second message 520 arrives at the Local 530, the RNIC's resource table may be in one of two states. In the first state, the RNIC has completed un-binding the resource, as shown in resource table 535, in response to the arrival of the last segment 540 of message one. Since the STag is not bound to an available resource, the RNIC will accordingly block message two 520 from accessing a resource and may generate an error indication 545. In the second state, the RNIC has not yet un-bound the resource in response to the arrival of the last segment 540 of message one, but the RNIC had at least set the OSF flag in the resource table 550. Since the OSF flag is set in the resource table 550 for the corresponding STag, the RNIC may block message two 520 from accessing the resource and generate an error indication 545.

Note that the DDP and RDMA protocols do not have message numbering for messages that address tagged buffers, such as those described by an MW or MR. However, the receiver RNIC can sometimes determine order using, for example, the TCP sequence number. Thus, RNIC may implement strategies for memory management, and these aspects of the present invention should not be limited by various other aspects of the present invention. For example, to prevent any placement of data except for segments of M1, the RNIC may limit its reception to strictly in-order TCP segments. Alternatively, for example, the RNIC may buffer out-of-order data until the TCP hole is plugged and then make placement decisions.

Figure 6:
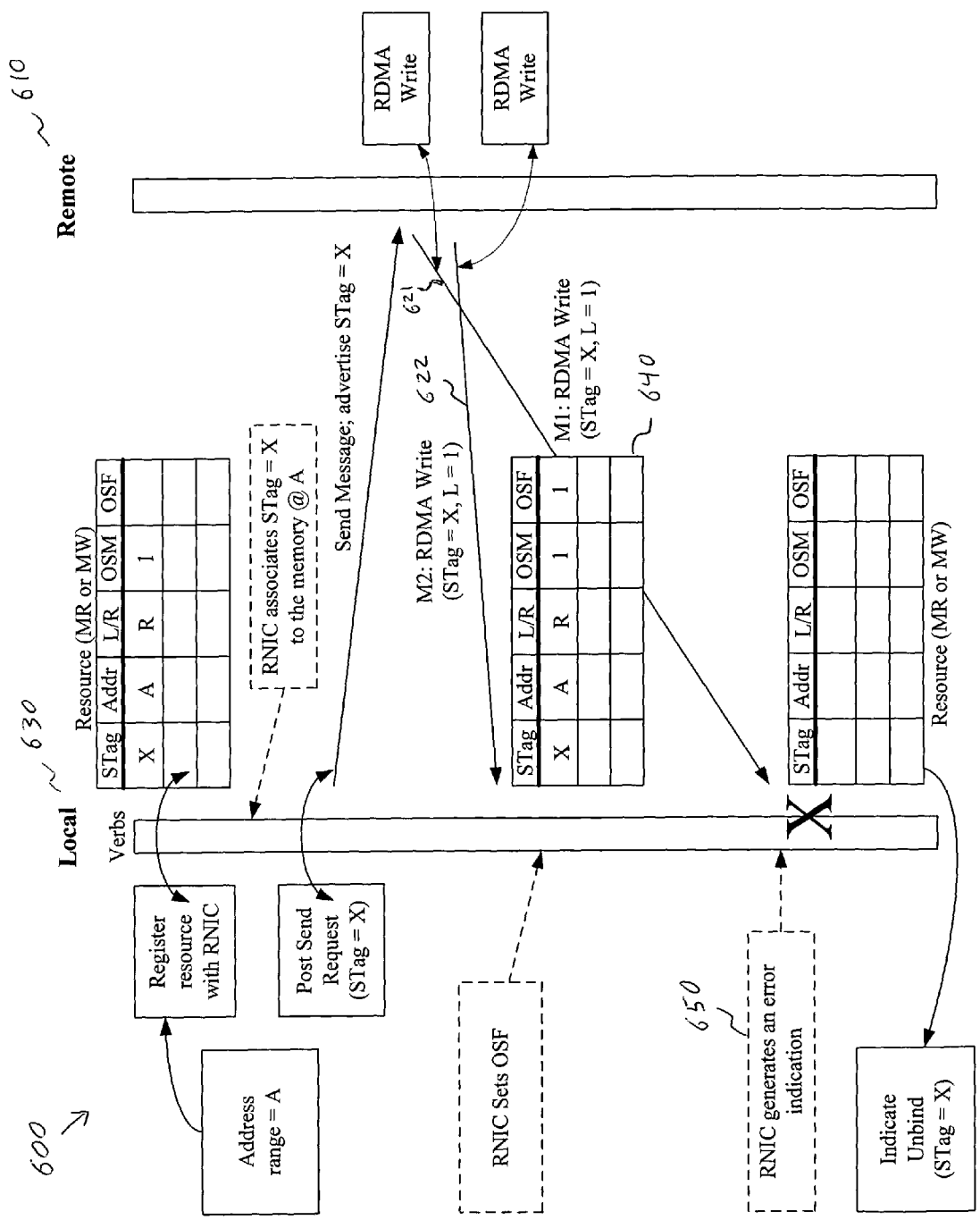
FIG. 6 is a diagram illustrating the operation of the one-shot model for the scenario where two sequential messages destined to access the same resource arrive out of order in accordance with various aspects of the present invention.

For a further illustration of aspects of the present invention, consider the scenario where two messages (M1 and M2) are sent to the same Window but arrive out of order. In this scenario, the RDMA-enabled network interface card (RNIC) is able to determine that an error condition exists. Refer now to FIG. 6 for an illustration.

FIG. 6 is a diagram 600 illustrating the operation of the one-shot model for the scenario where two sequential messages destined to access the same resource arrive out of order in accordance with various aspects of the present invention. Remote 610 initially sends message one 621 to Local 630 destined for STag X. Then Remote 610, for example, mistakenly sends message two 622 to Local 630 also destined for STag X. Because of inconsistent latency in the network, or for some other reason, message two 622 arrives at Local 630 before message one 621 arrives.

When message two 622, with its L-bit (or other indicator) set, arrives at Local 630, the RNIC sets the OSF flag in its resource table 640. Since message two 622 arrived before message one 621, there is a TCP hole condition. Note that the RNIC will not un-bind the resource until the TCP segments running up to the segment that contained the L-bit have been received.

When message one 621 arrives at Local 630 and attempts to access the one-shot resource corresponding to STag X, the RNIC will look to its resource table 640 and find the OSF flag for the resource set. This condition may, for example, trigger RNIC to deny message one 621 access to the resource and generate an error condition 650. The RNIC may not have the states to provide an error indication with the exact header for M2, so it may use the M1 header with an error code that indicates that there was an earlier out-of-order M2 that fired the window (set the OSF flag).

Note that in the case where segments of two messages, M1 and M2, are mixed on the wire, there may be multiple placements into the same memory resource (see discussion above on how to prevent multiple placements). However, because of the eventual reception of two messages containing an L-bit (or other indicator) that is set, the RNIC will eventually detect the error.

In summary, various aspects of the present invention provide for efficient implementation of a one-shot or N-shot remote direct access of memory, including automatic unbinding of memory resources.

While the invention has been described with reference to certain aspects of the invention, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for managing memory resources in a system that allows remote direct access of memory, the method comprising:
   at a local system that allows a remote system to directly access memory of the local system through a communication network, receiving a message segment from the remote system over the communication network, the received message segment directly accessing a section of memory of the local system that is designated to operate in a first mode, where the first mode is characterized by a maximum number of N remote direct accesses to the section of memory by the remote system; and
   at the local system, setting an N-shot fired (NSF) flag associated with the section of memory in response to at least the received message segment.

2. The method of claim 1, further comprising determining if the received message segment includes a last-segment indicator.

3. The method of claim 2, wherein the last-segment indicator is an L-bit in RDMA communications.

4. The method of claim 2, wherein the NSF flag-setting step comprises setting the NSF flag if the received message segment includes information indicating that the received message segment is a last message segment of a message.

5. The method of claim 1, wherein:
   N=1;
   the first mode is a one-shot mode (OSM); and
   the N-shot-fired (NSF) flag comprises a one-shot-fired (OSF) flag associated with the section of memory.

6. The method of claim 5, further comprising setting an OSM flag associated with the section of memory to indicate that the section of memory is in a one-shot-mode, and wherein setting an NSF flag in response to at least the received message segment comprises setting the OSF flag associated with the section of memory to indicate that a one-shot access of the section of memory is complete.

7. The method of claim 6, wherein at least one of the OSM flag and the OSF flag is a single bit.

8. The method of claim 6, wherein the flag-setting steps are performed by a network interface card.

9. The method of claim 5, wherein receiving a message segment from the remote system over the communication network, the received message segment directly accessing a section of memory of the local system that is designated to operate in a first mode, comprises receiving the message segment from the remote system over the communication network, the received message segment attempting to access a section of memory that is designated to operate in a one-shot mode, the method further comprising determining if the OSF flag associated with the section of memory is set.

10. The method of claim 9, further comprising:
   accessing the section of memory according to the received message segment if the OSF flag is not set; and
   denying access to the section of memory if the OSF flag is set.

11. The method of claim 10, further comprising generating an error message if the OSF flag is set.

12. The method of claim 9, further comprising configuring the system to only receive message segments that are in order.

13. The method of claim 9, further comprising storing out-of-order received message segments in a buffer at least until preceding TCP holes are plugged.

14. The method of claim 1, further comprising setting an N-shot-mode (NSM) flag associated with the section of memory, and wherein receiving a message segment from the remote system over the communication network, the received message segment directly accessing a section of memory of the local system that is designated to operate in a first mode comprises:
   receiving a message segment from the remote system over the communication network, the received message segment attempting to directly access the section of memory of the local system;
   analyzing the NSM flag to determine if the section of memory has been designated to operate in an N-shot mode; and
   processing the received message segment according to the results of the analyzing step.

15. The method of claim 14, wherein the message segment processing step comprises analyzing the received message segment to determine if the received message segment includes information indicating that the received message segment is a last message segment of a message.

16. The method of claim 15, wherein setting an NSF flag associated with the section of memory in response to at least the received message segment comprises setting the NSF flag if it is determined that the received message segment includes a last-segment indicator corresponding to a last segment of a message, and N-1 previous message segments have been received accessing the section of memory.

17. The method of claim 15, wherein the message segment processing step further comprises incrementing a shots-fired counter associated with the section of memory in response to the received message segment.

18. The method of claim 14, wherein the message segment processing step comprises analyzing the NSF flag to determine if the section of memory is closed to further access.

19. The method of claim 18, wherein the message segment processing step comprises generating an error message if the NSF flag indicates that the section of memory is closed to further access.

20. The method of claim 1, wherein N=1, and the first mode is a one-shot mode.

21. A network interface for managing remote direct access of memory, the network interface comprising at least one circuit operable to, at least:
   at a local system that allows a remote system to directly access memory of the local system through a communication network, receive a message segment from the remote system over the communication network, the received message segment directly accessing a section of memory of the local system that is designated to operate in a first mode, where the first mode is characterized by a maximum number of N remote direct accesses to the section of memory by the remote system; and at the local system, set an N-shot (NSF) flag associated with the section of memory in response to at least the received message segment.

22. The network interface of claim 21, wherein:
N=1;
the first mode is a one-shot mode (OSM); and
the N-shot-fired (NSF) flag is a one-shot-fired (OSF) flag associated with the section of memory.

23. The network interface of claim 21, wherein the at least one circuit is further operable to:
set an N-shot-mode (NSM) flag associated with the section of memory to indicate that the section of memory has been designated to operate in an N-shot mode;
receive a message segment from a remote system over a communication network, the message segment attempting to directly access the section of memory;
analyze the NSM flag to determine if the section of memory has been designated to operate in an N-shot mode; and
process the received message segment according to the results of analyzing the NSM flag.

24. The network interface of claim 21, wherein the at least one circuit is disposed on a network interface card.

\* \* \* \* \*